United States Patent [19]

Sigafoo

[11] Patent Number: 4,728,119
[45] Date of Patent: Mar. 1, 1988

[54] TRAVEL CHAIR FOR THE ELDERLY AND PHYSICALLY HANDICAPPED

[75] Inventor: Roland Sigafoo, Tallahassee, Fla.
[73] Assignee: Trav-L-Chair, Inc., Tallahassee, Fla.
[21] Appl. No.: 922,475
[22] Filed: Oct. 23, 1986

Related U.S. Application Data

[63] Continuation of Ser. No. 765,449, Aug. 14, 1985, abandoned.
[51] Int. Cl.$^4$ ............................................. B62B 7/06
[52] U.S. Cl. ........................... 280/657; 280/242 WC; 280/642; 280/650; 280/801; 297/440; 297/485; 297/486; 297/DIG. 4
[58] Field of Search ....... 280/657, 242 WC, 289 WC, 280/643, 642, 650, 801, 30; 5/81 R, 81 C; 414/921; 297/485, 486, 440, DIG. 4

[56] References Cited

U.S. PATENT DOCUMENTS 3,992,028 11/1976 Abe et al. ............................ 297/485

Primary Examiner—David M. Mitchell
Assistant Examiner—Eric D. Culbreth
Attorney, Agent, or Firm—Kerkam, Stowell, Kondracki & Clarke

[57] ABSTRACT

The travel chair has a form-fitted shell which is attached to a metal frame, capable of transporting handicapped and elderly persons from their residence; through public transportation terminals; aboard public transportation vehicles, such as aircraft and busses; hence to their destination without the individual leaving the apparatus. Folding rear legs allows the apparatus to be placed in a conventional seat without the individual leaving the shell. In limited spaces, the shell can be removed from the frame and placed in a conventional seat without the individual leaving the shell. In either configuration, the person, while remaining in the shell, can use conventional restraint devices, such as aircraft and automotive seat belts. In addition, inherent safety devices are incorporated in the apparatus for personal security. For storing or separate transportation, both the front and rear legs of the apparatus can be folded; thereby reducing the required space by approximately one-half.

20 Claims, 15 Drawing Figures

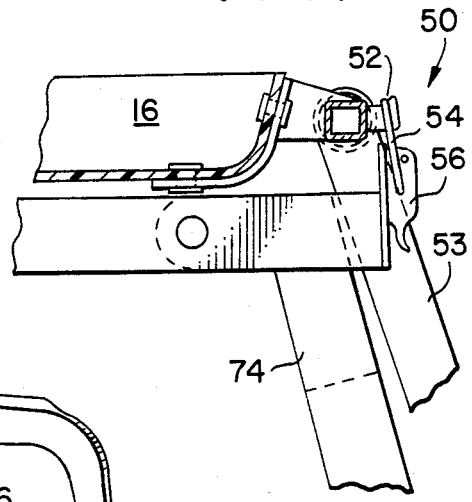
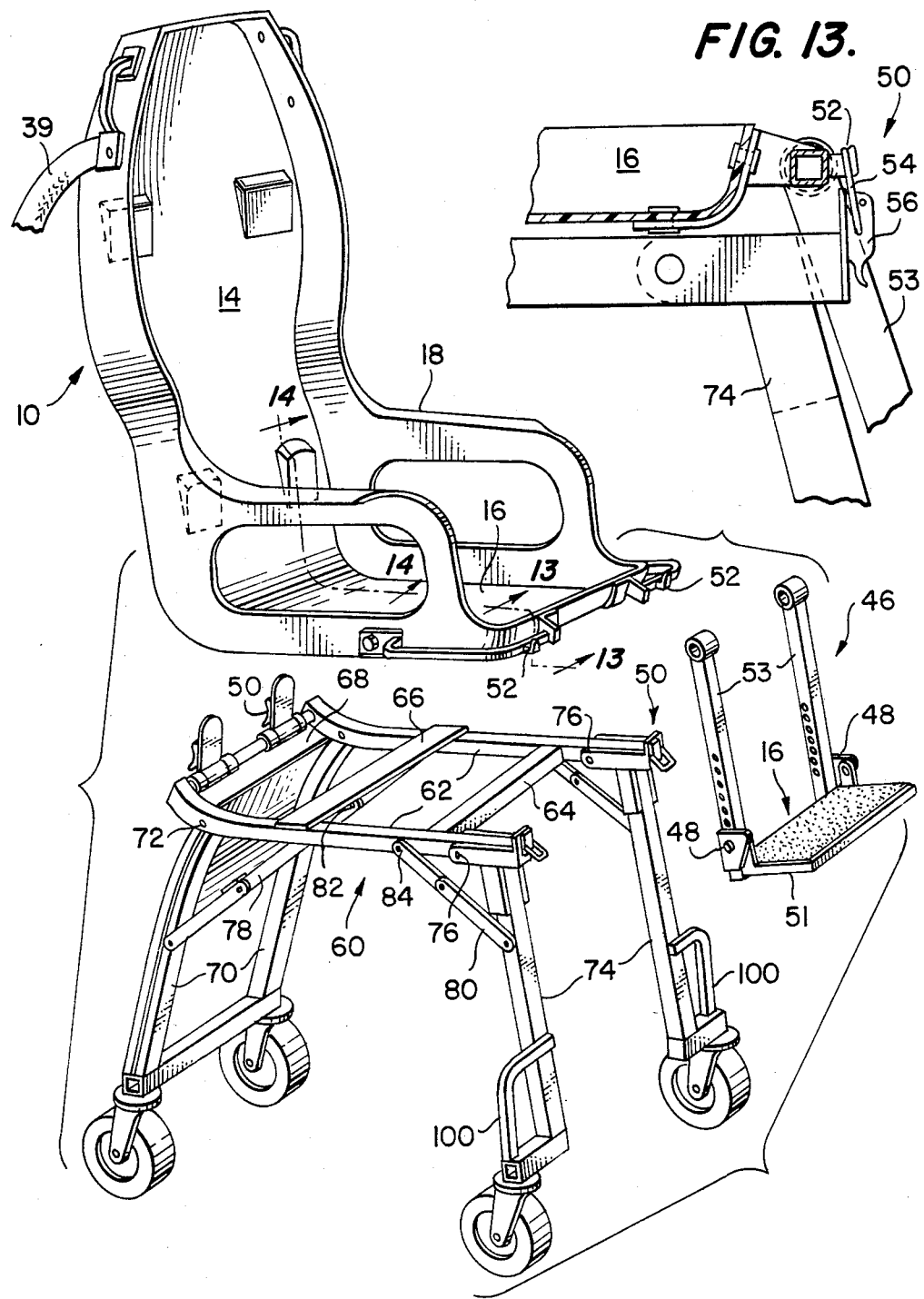
FIG. 12.
FIG. 13.

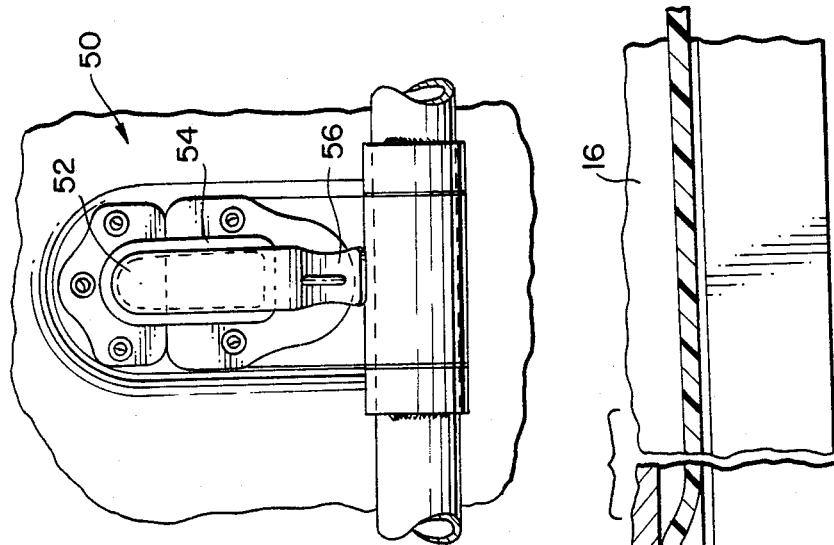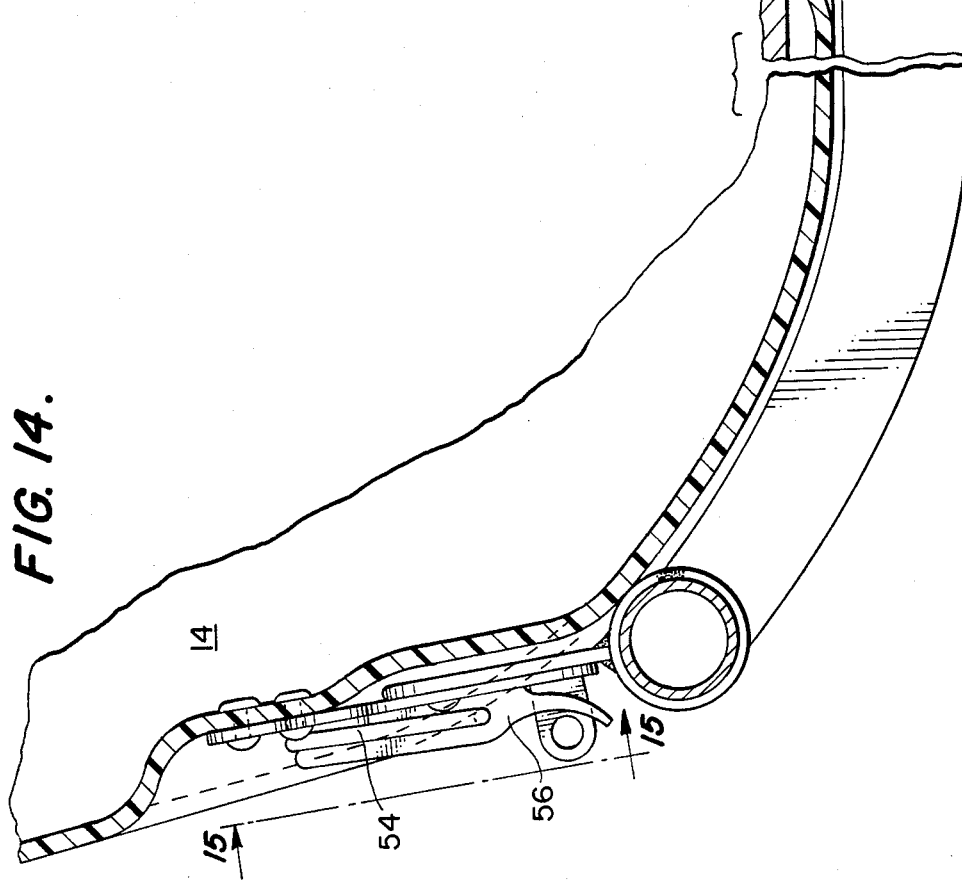

TRAVEL CHAIR FOR THE ELDERLY AND PHYSICALLY HANDICAPPED

This is a continuation of application Ser. No. 765,449, filed Aug. 14, 1985, now abandoned.

BACKGROUND OF THE INVENTION

The present invention relates to a portable travel chair that will provide handicapped or elderly persons with the ability to travel in aircraft, busses and other forms of public transportation without being physically handled, inconvenienced or dehumanized.

In the past, it has been common to physically transfer handicapped or elderly persons several times between wheelchairs in airport terminals, boarding chairs when enplaning on an aircraft; then into an aircraft seat. The procedure is then reversed when handicapped or elderly persons deplane at their destination. In most cases, this procedure causes distress or discomfort to the person and in many instances, the person suffers further injuries due to excessive mishandling. Persons with certain handicaps cannot receive adaquate support from conventional seating in aircraft, busses and other forms of public or private transportation; therefore their ability to travel is severely limited.

The present invention will allow handicapped or elderly persons to be placed in the travel chair at home, then transported in their private vehicle to an airport or other public transportation facility, and be loaded aboard an aircraft, bus or other public transportation vehicle and ride in a conventional seat while remaining in the travel chair. Handicapped and elderly persons will use conventional safety restraints in addition to those provided for the travel chair thus providing an extra measure of safety.

The following U.S. patents are typical of prior art transportation devices for elderly and handicapped persons.

U.S. Pat. No. Re: 30,867—Geoffrey
U.S. Pat. No. 3,216,738—Bockus
U.S. Pat. No. 3,889,963—Brattgard
U.S. Pat. No. 4,113,307—Day
U.S. Pat. No. 4,229,039—Day
U.S. Pat. No. 4,354,791—Antonellis
U.S. Pat. No. 4,457,528—Jchihawa et al

SUMMARY OF THE INVENTION

The chair of the invention is provided with a molded or otherwise formed unitary shell which is attached to a wheeled metal frame, with folding front and rear legs, and four castor wheels. Leg rests and foot pad(s) are attached to the shell to provide an integral apparatus with or without the shell being attached to the wheeled frame. Two hand holds are incorporated into the upper portion of the shell back rest and two are positioned at the forward outer edge of the shell cushion or seat area. Further hand holds are provided at the lower ends of the front legs of metal frame or dolly. This enables easy moving of the entire apparatus and assists in positioning the apparatus in a conventional seat. The rear legs/wheels fold into the frame/shell, which is equipped with a panel to protect seat upholstery, thereby allowing the apparatus to be placed in a conventional seat without requiring an individual to be removed from the shell. In situations where space does not permit the shell to remain on the frame, the shell including the leg rest(s) and foot pad(s) may be removed from the wheeled frame, while the person remains in it, and placed in a conventional seat. Conventional safety devices, in addition to those embodied in the travel chair provide protection to the person. The front and rear legs can be folded into the frame, reducing the size of the wheeled frame to overall dimensions of, for example, 8" high × 23" long × 18" wide which can be stored in a luggage compartment of the transportation vehicle until needed.

BRIEF DESCRIPTION OF THE DRAWINGS

Other objects, features and advantages of this invention will be apparent from the written description and drawings in which:

FIG. 12 is an exploded view of the dolly, footrest and shell of the structures of the invention with the padding removed from the shell for clarity;

FIG. 13 is a section on line 13—13 of FIG. 12 illustrating attaching means for the footrest;

FIG. 14 is a section on line 14—14 of FIG. 12, and

FIG. 15 is a section on line 15—15 of FIG. 14 illustrating releasable attaching means for attaching the shell to the frame or dolly.

DESCRIPTION OF THE PREFERRED EMBODIMENT

Figure 1:
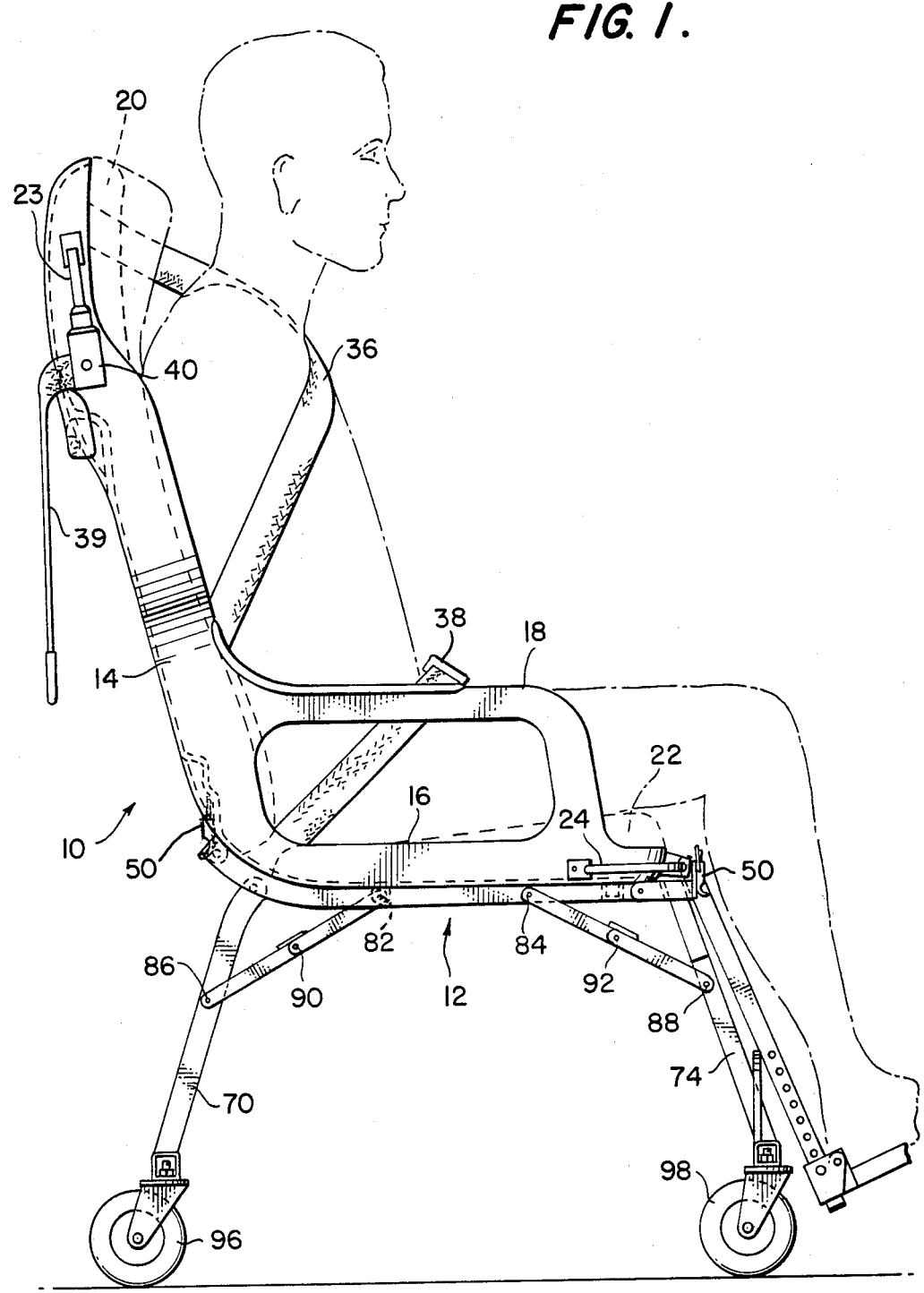
FIG. 1 is a side elevational view of the travel chair of the invention showing the body supporting shell and wheeled frame with the wheels in their extended operational position.

Referring to the drawings, the travel chair for transporting handicapped and elderly persons generally comprises a shell 10 and a dolly 12. The shell 10 is preferably formed by molding from plastic and includes a back portion 14, a seat portion 16 and armrests 18. In the drawings, the shell portion 10 is illustrated as being provided with a back cushion 20 and seat cushion 22 for the comfort of the occupant.

Figure 2:
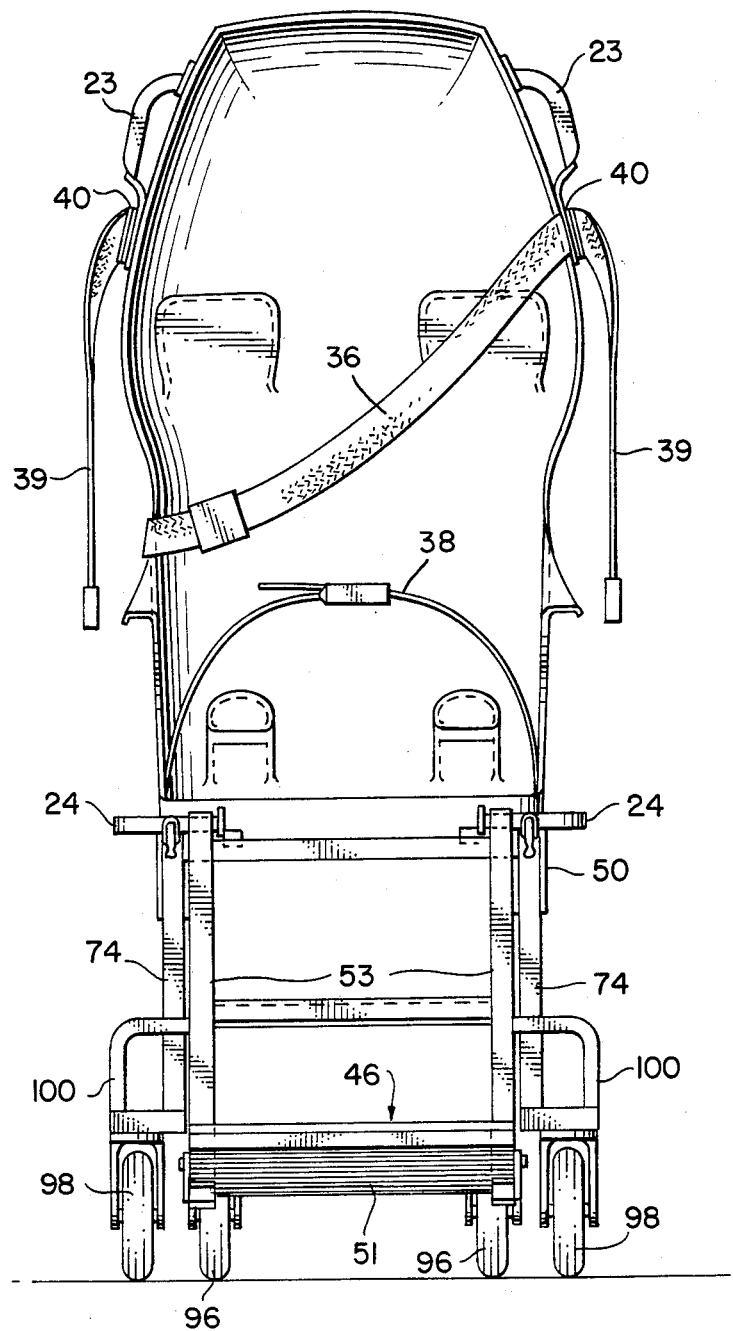
FIG. 2 is a front elevational view of the structure shown in FIG. 1.

Attached to the upper sides of the shell 14 are a pair of upper hand grips 23 and a pair of lower hand grips 24, as seen in FIG. 2 of the drawings.

Figure 4:
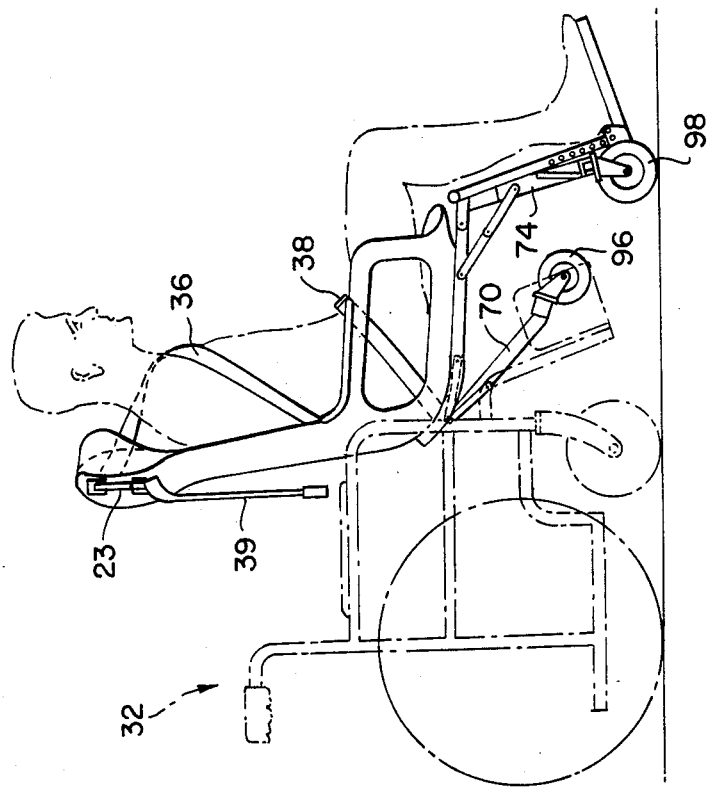
FIG. 4 is a view like FIG. 3 illustrating a step in removal of the travel chair from the transport vehicle and illustrating the front wheels in ground contact and the rear wheels approaching their lower or extended position.
Figure 3:
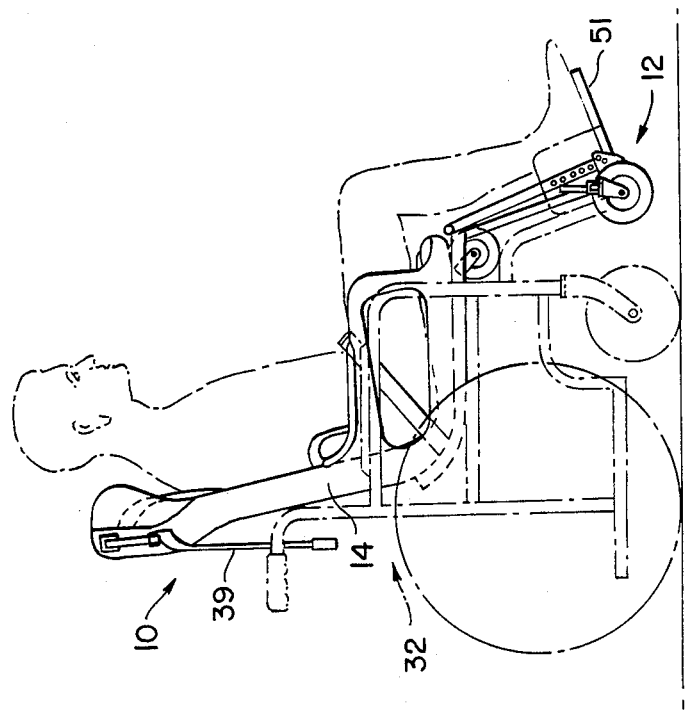
FIG. 3 illustrates the travel chair of the invention with the rear wheels folded and the structures placed on a transport vehicle.
Figure 6:
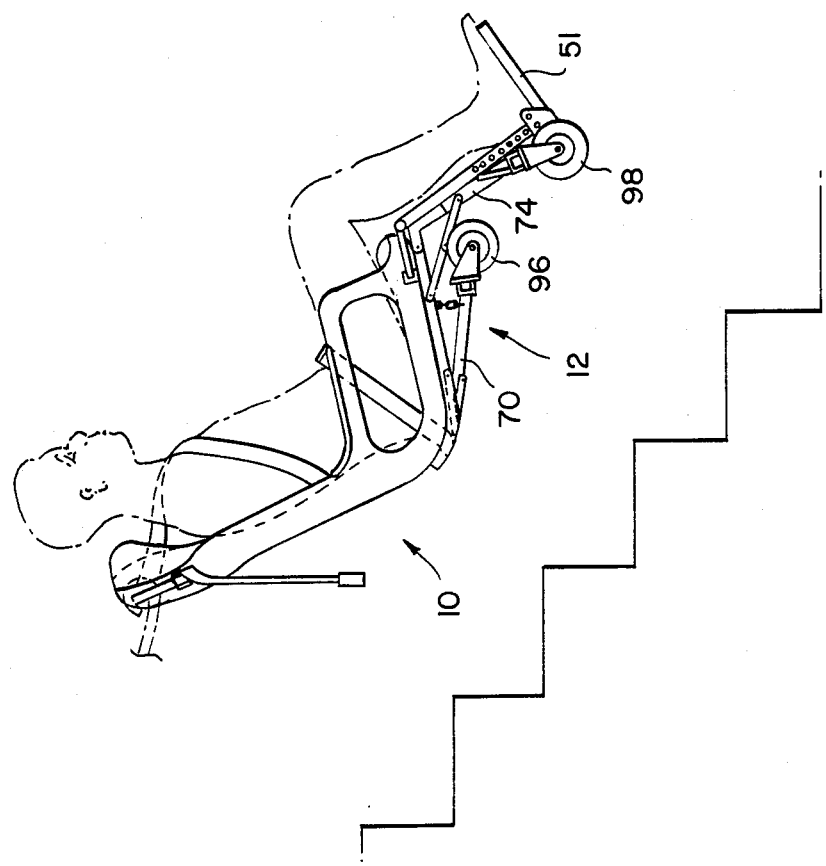
FIG. 6 illustrates one position of the travel chair for moving an occupant up or down a stair flight or escalator.
Figure 5:
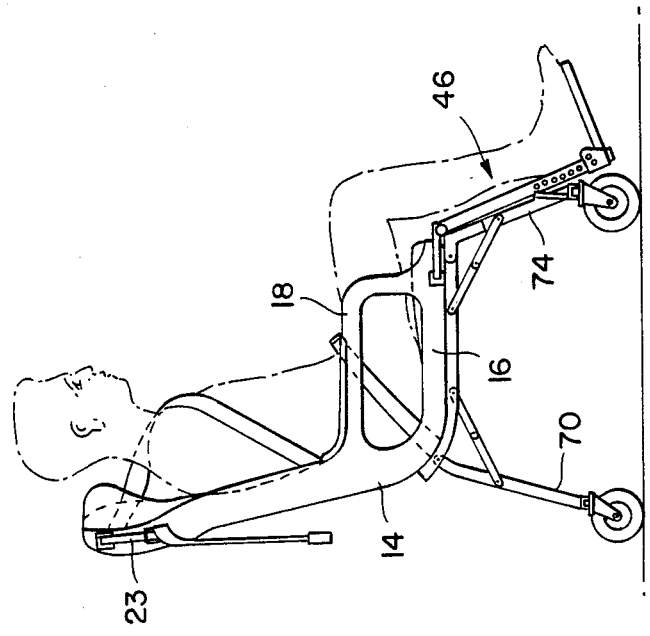
FIG. 5 illustrates the travel chair arranged to move the occupant along a flat surface.
Figure 7:
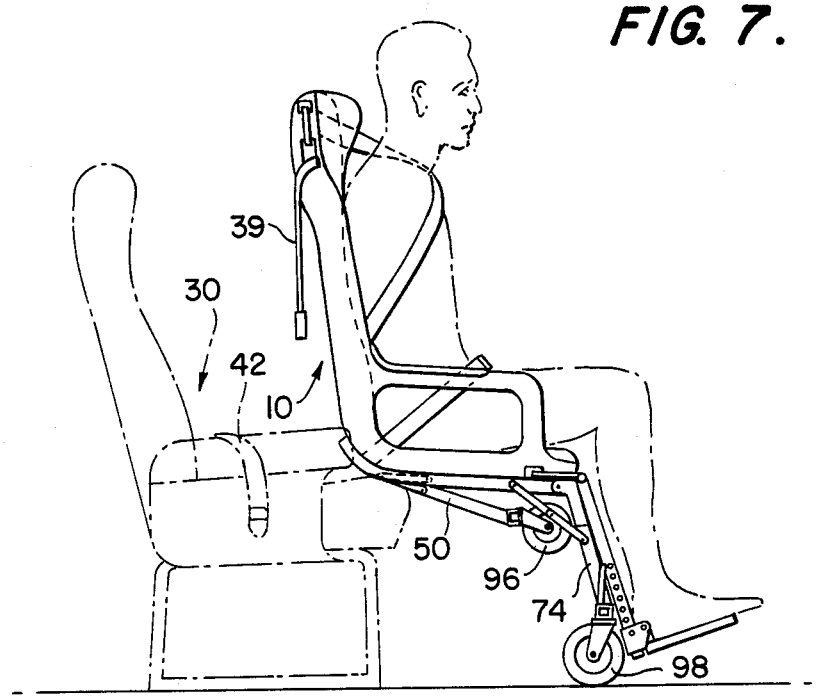
FIG. 7 illustrates a step in positioning the travel chair of the invention in, for example, a conventional aircraft seat.
Figure 8:
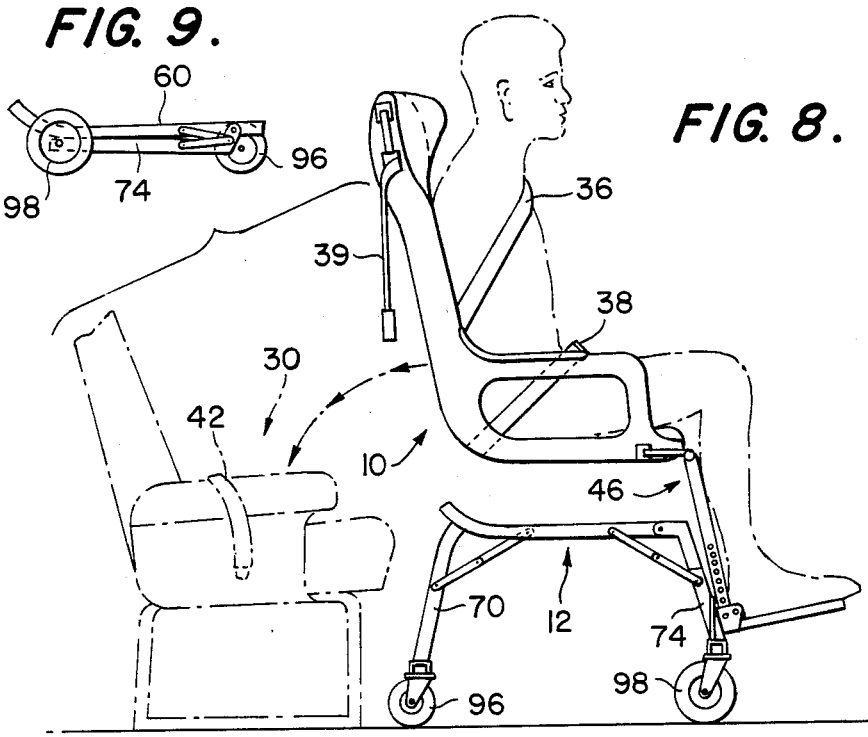
FIG. 8 illustrates another way of employing the travel chair wherein the wheeled frame or dolly is removed from the shell.

The upper and lower hand grips 23 and 24 are for physically moving the shell or shell and dolly or carriage into position onto a seat of, for example, an airline as shown in broken lines in FIGS. 7 and 8 and designated 30. The upper and lower hand grips are also useful in placing the shell and/or shell and carriage or dolly in a supplemental transport wheelchair such as illustrated at 32 in FIGS. 3 and 4. Also associated with the shell are restraints or safety belts such as illustrated at 36 and 38 which are anchored as at 40 (FIGS. 1 and 2.)

Figure 10:
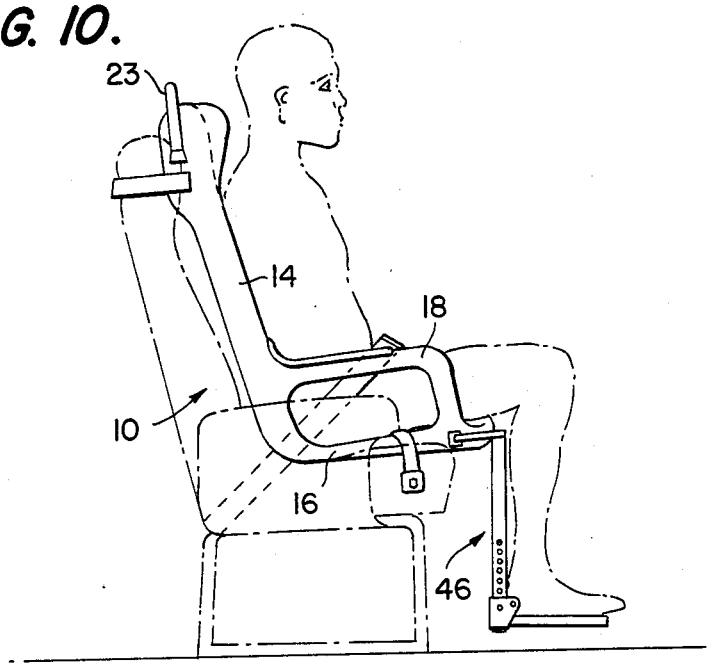
FIG. 10 illustrates the shell of the travel seat fastened in a conventional seating space such as found on aircraft.

The upper and lower restraint belts 36 and 38 ensure that the occupant is secured to the shell 10 and when the occupant is placed in a seat such as airline seat 30, FIGS. 7 and 8. A further upper restraint 39 (see particularly FIGS. 2 and 10) may be used to secure the shell or the shell and dolly to the seat and the normal airline seatbelt such as illustrated at 42 is secured about the seat and the occupant.

At the forward portion of the shell, FIGS. 2, 12 and 13, and associated with the hand holds 24 a footrest to receive a patients feet as generally indicated at 46 having sliding height adjustment means as illustrated at 48.

The foot support 51 of assembly 46 is mounted for pivot movement as are the foot support tubes 53. Further, at the forward and rearward ends of the shell there are provided latching means 50, FIGS. 12 and 13 which connect the front and rear ends of the shell to the dolly or wheeled frame. The latches 50 are of conventional configuration and include a keeper 52, a latching bar 54 and an actuator 56, FIGS. 14 and 15. As best shown in FIG. 14, each of the latches at the rear of the dolly are disposed within a forwardly recessed portion of the back 14.

Figure 9:
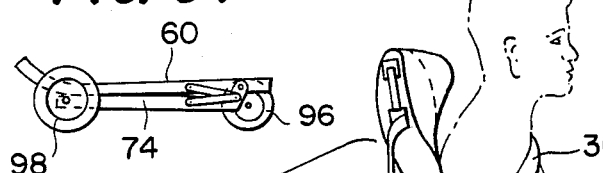
FIG. 9 illustrates the frame or dolly in a folded storage position.

By means of the four latches the shell 10 is readily removed from and attached to the metal dolly 12. The dolly is composed of a metal frame 60 having left and right rails of square tubular metal designated 62 and transverse front, center and rear metal flat elements 64, 66 and 68 respectively. The tubular top frame 60 pivotally thusly mounts a pair of rear legs 70 mounted to pivot pins 72 and a pair of front legs 74 connected to front pivots 76. The front and rear legs 70 and 74 are each stabilized by brackets 78 in the rear and 80 in the front, which brackets are pivoted to the frame 60 as at 82 and 84 and the front and rear legs as at 86 and 88 respectively. When the brackets 78 and 80 are in latched position as shown in FIG. 1 folding movement of the front and rear legs is prevented, however, when the latching bars are urged upwardly at their center pivots 90 and 92 the legs fold into close nesting position into the top frame 60 as illustrated in FIG. 9. The rear legs are provided with castor type wheels 96 and similar castor type wheels 98 are supported by the front legs 74. In order to permit close folding of the legs in relation to the top frame 60 wheels of about 4 inches in diameter have been found to be very suitable. Having both the front and the rear wheels of the castor type renders the travel chair very maneuverable in the normally tight confines of commercial aircraft and busses.

Figure 11:
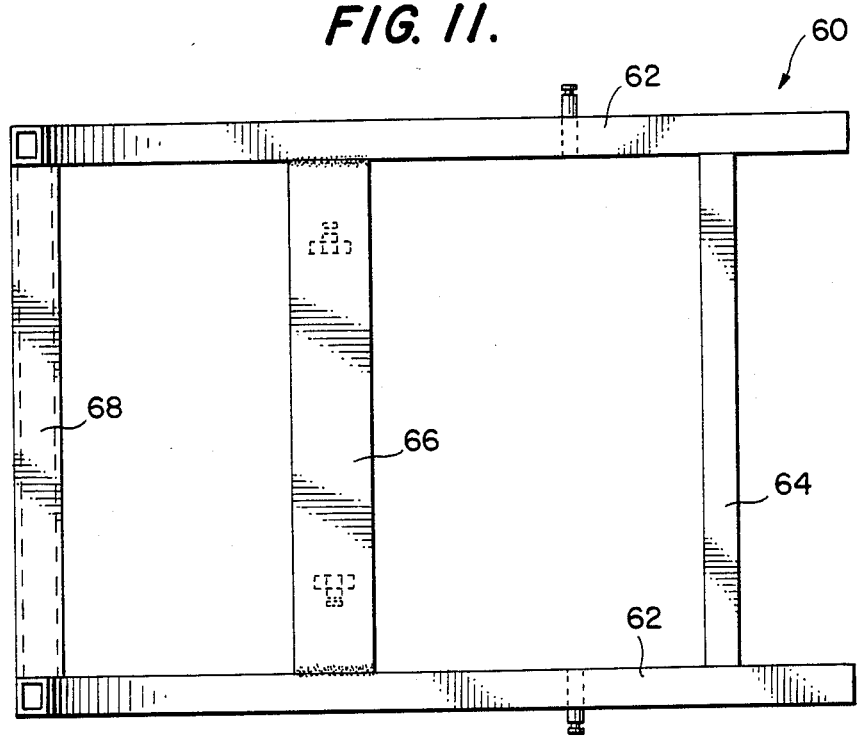
FIG. 11 is a top plan view of the dolly or frame of the travel chair.

It will be particularly noted from FIG. 2 that the front legs 24 and the front wheels are spaced apart a greater distance than the rear legs 70 and the rear wheels 96 so that when folded the rear legs lie inside of the front legs and wheels to provide a very compact nested unit. As shown in FIG. 9, the front wheels 98 will be disposed at the rear and to the outside of the side rails 62 (labeled in FIGS. 11 and 12) of top frame 60 when the legs 74 are folded.

As previously indicated, if the seats of the commercial vehicles will not support the shell and the dolly the dolly is readily disconnected from the shell 10 and the shell with the patient strapped thereto is lifted onto the seat and the dolly folded for convenient storage. As best shown in FIG. 2, the hand holds 100 include a sideways extending portion and a downwardly extending portion which is generally orthogonal to the sideways extending portion.

To assist in maneuvering the travel chair on stairs at the front of the dolly are additional hand holds 100 best seen in FIG. 12 of the drawings.

While applicant's invention has been described in reference to a metal dolly and a plastic shell it will be appreciated that both the shell and the dolly may be molded or casted from plastic with or without reinforcing means or both the dolly and the shell may be formed of metal.

I claim:

1. Transportation means for handicapped and elderly persons comprising a shell and a wheeled dolly, said shell comprising a unitary molded back, seat and arm support, said seat having at least a front and two opposite sides, hand holds mounted at each side of the back and at the front of each side of the seat, restraint means for the person to be transported attached to the shell and further a restraining belt secured to the shell and releasably securable about the seat back of a vehicle, said dolly including a top frame sized to receive the seat portion of the shell, said top frame including side rails on opposite sides of said dolly, said side rails extending lengthwise front to back along said seat, a pair of front and a pair of rear legs, the pair of front legs having upper ends pivotably attached to said top frame by front pivots at a front of said side rails, the pair of rear legs having upper ends pivotably attached to said top frame by rear pivots at a rear of said side rails, said rear pivots spaced from said front pivots, each of said pairs of legs independently foldable inwardly to extend lengthwise along the underside of said top frame, wheels at the lower ends of each of said pairs of front and rear legs, lock bars for the said pairs of front and rear legs, and latching means for attaching the dolly to said shell, and wherein, upon inward folding of the pair of rear legs, the dolly and shell are operable for placement upon a chair of a transportation vehicle with the seat and back of the shell respectively extending along a seat and a back of the chair and with the front legs extending down in front of the chair, and upon unlatching of said latching means, said dolly is removable from said shell such that said shell is operable for placement upon a chair of a transportation vehicle with the seat and back of the shell respectively extending along a seat and a back of the chair and wherein said dolly is compactable when unlatched from said shell with its rear legs folded forwardly such that the wheels of said rear legs are disposed at the front of said side rails and with its front legs folded backwardly such that the wheels of said front legs are disposed at the rear and to the outside of said side rails.

2. The transportation a means for handicapped and elderly persons as defined in claim 1 further including a footrest pivotly attached to the front of the seat of said shell; said footrest including a pair of legs and a foot support platform adjustably mounted thereon.

3. The transportation means for handicapped and elderly persons as defined in claim 1 wherein the wheels for the pair of front and rear legs are castor wheels and the said front and rear legs fold inwardly to provide a substantially flat compact dolly when the legs are folded.

4. The transportation means for handicapped and elderly persons as defined in claim 3 wherein the front legs are spaced apart a greater distance than the rear legs so that when the front and rear legs are folded inwardly the legs are in side by side relationship to provide a compact folded dolly.

5. The transportation means for elderly and handicapped persons as defined in claim 1 wherein the shell is molded from plastic material.

6. The transportation means for elderly and handicapped persons as defined in claim 1 wherein associated with each of the front legs is an additional hand hold and the wheels for each of the pair of front and rear legs are castor wheels.

7. The transportation means for handicapped and elderly persons as defined in claim 3 wherein said latching means includes at least two latches to attach said dolly to said shell at the front and at least two latches to attach said dolly to said shell at the back.

8. The transportation means for handicapped and elderly persons as defined in claim 1 wherein a back pad and seat pad are provided for the plastic shell.

9. The transportation means for handicapped and elderly persons as defined in claim 1 wherein said latching means includes at least two front latches, each front latch releasably securing a front of one of said side rails to a front edge of said seat.

10. The transportation means for handicapped and elderly persons as defined in claim 9 wherein said latching means includes at least two rear latches which releasably secure said dolly to said shell at the back, said rear latches being disposed within a forwardly recessed portion of said back.

11. The transportation means for handicapped and elderly persons as defined in claim 1 further including low hand holds at lower ends of each front leg, each low hand hold including a sideways extending portion and a downwardly extending portion generally orthogonal to the sideways extending portion.

12. Transportation means for handicapped and elderly persons comprising a shell and a wheeled dolly, said shell comprising a unitary molded back, seat and arm support, said seat having at least a front and two opposite sides, hand holds mounted at each side of the back and at the front of each side of the seat, restraint means for the person to be transported attached to the shell and further a restraining belt secured to the shell and releasably securable about the seat back of a vehicle, said dolly including a top frame sized to receive the seat portion of the shell, said top frame including side rails on opposite sides of said dolly, said side rails extending lengthwise front to back along said seat, a pair of front and a pair of rear legs, the pair of front legs having upper ends pivotably attached to said top frame by front pivots at a front of said side rails, the pair of rear legs having upper ends pivotably attached to said top frame by rear pivots at a rear of said side rails, said rear pivots spaced from said front pivots, each of said pairs of legs independently foldable inwardly to extend lengthwise along the underside of said top frame, wheels at the lower ends of each of said pairs of front and rear legs, lock bars for the said pairs of front and rear legs, and latching means for attaching the dolly to said shell, and wherein, upon inward folding of the pair of rear legs, the dolly and shell are operable for placement upon a chair of a transportation vehicle with the seat and back of the shell respectively extending along a seat and a back of the chair and with the front legs extending down in front of the chair, and upon unlatching of said latching means, said dolly is removable from said shell such that said shell is operable for placement upon a chair of a transportation vehicle with the seat and back of the shell respectively extending along a seat and a back of the chair, and wherein said latching means includes at least two front latches, each front latch releasably securing a front of one of said side rails to a front edge of said seat.

13. The transportation means for handicapped and elderly persons as defined in claim 12 wherein said latching means includes at least two rear latches which releasably secure said dolly to said shell at the back, said rear latches being disposed within a forwardly recessed portion of said back.

14. The transportation means for handicapped and elderly persons as defined in claim 13 further including low hand holds at lower ends of each front leg, each low hand hold including a sideways extending portion and a downwardly extending portion generally orthogonal to the sideways extending portion.

15. The transportation means for handicapped and elderly persons as defined in claim 14 wherein said dolly is compactable when unlatched from said shell with its rear legs folded forwardly such that the wheels of said rear legs are disposed at the front of said side rails and with its front legs folded backwardly such that the wheels of said front legs are disposed at the rear and to the outside of said side rails.

16. Transportation means for handicapped and elderly persons comprising a shell and a wheeled dolly, said shell comprising a unitary molded back, seat and arm support, said seat having at least a front and two opposite sides, hand holds mounted at each side of the back and at the front of each side of the seat, restraint means for the person to be transported attached to the shell and further a restraining belt secured to the shell and releasably securable about the seat back of a vehicle, said dolly including a top frame sized to receive the seat portion of the shell, said top frame including side rails on opposite sides of said dolly, said side rails extending lengthwise front to back along said seat, a pair of front and a pair of rear legs, the pair of front legs having upper ends pivotably attached to said top frame by front pivots at a front of said side rails, the pair of rear legs having upper ends pivotably attached to said top frame by rear pivots at a rear of said side rails, said rear pivots spaced from said front pivots, each of said pairs of legs independently foldable inwardly to extend lengthwise along the underside of said top frame, wheels at the lower ends of each of said pairs of front and rear legs, lock bars for the said pairs of front and rear legs, and latching means for attaching the dolly to said shell, and wherein, upon inward folding of the pair of rear legs, the dolly and shell are operable for placement upon a chair of a transportation vehicle with the seat and back of the shell respectively extending along a seat and a back of the chair and with the front legs extending down in front of the chair, and upon unlatching of said latching means, said dolly is removable from said shell such that said shell is operable for placement upon a chair of a transpotation vehicle with the seat and back of the shell respectively extending along a seat and a back of the chair, and wherein said latching means includes at least two rear latches which releasably secure said dolly to said shell at the back, said rear latches being disposed within a forwardly recessed portion of said back.

17. The transportation means for handicapped and elderly persons as defined in claim 16 further including low hand holds at lower ends of each front leg, each low hand hold including a sideways extending portion and a downwardly extending portion generally orthogonal to the sideways extending portion.

18. The transportation means for handicapped and elderly persons as defined in claim 17 wherein said dolly is compactable when unlatched from said shell with its rear legs folded forwardly such that the wheels of said rear legs are disposed at the front of said side rails and with its front legs folded backwardly such that the wheels of said front legs are disposed at the rear and to the outside of said side rails.

19. Transportation means for handicapped and elderly persons comprising a shell and a wheeled dolly, said shell comprising a unitary molded back, seat and arm support, said seat having at least a front and two opposite sides, hand holds mounted at each side of the back and at the front of each side of the seat, restraint means for the person to be transported attached to the shell and further a restraining belt secured to the shell and releasably securable about the seat back of a vehicle, said dolly including a top frame sized to receive the seat portion of the shell, said top frame including side rails on opposite sides of said dolly, said side rails extending lengthwise front to back along said seat, a pair of front and a pair of rear legs, the pair of front legs having upper ends pivotably attached to said top frame by front pivots at a front of said side rails, the pair of rear legs having upper ends pivotably attached to said top frame by rear pivots at a rear of said side rails, said rear pivots spaced from said front pivots, each of said pairs of legs independently foldable inwardly to extend lengthwise along the underside of said top frame, wheels at the lower ends of each of said pairs of front and rear legs, lock bars for the said pairs of front and rear legs, and latching means for attaching the dolly to said shell, and wherein, upon inward folding of the pair of rear legs, the dolly and shell are operable for placement upon a chair of a transportation vehicle with the seat and back of the shell respectively extending along a seat and a back of the chair and with the front legs extending down in front of the chair, and upon unlatching of said latching means, said dolly is removable from said shell such that said shell is operable for placement upon a chair of a transportation vehicle with the seat and back of the shell respectively extending along a seat and a back of the chair and further including low hand holds at lower ends of each front leg, each low hand hold including a sideways extending portion and a downwardly extending portion generally orthogonal to the sideways extending portion.

20. The transportation means for handicapped and elderly persons as defined in claim 19 wherein said latching means includes at least two front latches, each front latch releasably securing a front of one of said side rails to a front edge of said seat.

* * * * *